Patented Mar. 25, 1930

1,752,145

UNITED STATES PATENT OFFICE

WILLIAM S. CALCOTT AND HERBERT W. WALKER, OF PENNS GROVE, NEW JERSEY, ASSIGNORS TO E. I. DU PONT DE NEMOURS & COMPANY, OF WILMINGTON, DELAWARE, A CORPORATION OF DELAWARE

NONCORROSIVE ALCOHOLIC SOLUTIONS

No Drawing. Application filed October 22, 1928. Serial No. 314,316.

This invention relates to aqueous solutions of polyhydric alcohols which are substantially inert with respect to iron. More particularly, it pertains to the use of fatty acids as a class of compounds which act as inhibitors for iron corrosion by aqueous solutions of polyhydric alcohols. As is well known, water solutions of these alcohols attack metallic iron in the form of free metal, steel and cast iron, very rapidly under ordinary conditions and considerable corrosion, as indicated by spots of rust, iron oxide deposits and sediment, takes place.

We have found that if a small amount of a higher fatty acid which is insoluble or substantially insoluble in water, such as stearic, oleic, palmitic acid and water insoluble fatty acids derived from the oxidation of petroleum or a mixture of such fatty acids, be added to a glycol or trihydric alcohol and the alcohol then diluted with water to any desired concentration there results a solution in which the rate of corrosion of iron is markedly decreased. A distinct protective action on iron is observed in polyhydric alcohol solutions treated with such fatty acids.

For example, if oleic acid in an amount sufficient to make 0.1% of the final aqueous solution be added to a trihydric alcohol as, for example, glycerine, or to a dihydric alcohol as, for example, ethylene glycol and water added to the polyhydric alcoholic solution of the fatty acid to produce a 40% solution of alcohol there is thereby formed a solution which during a period of several days at a temperature of 85–90° C. effectively inhibits the corrosion ordinarily taking place when iron is exposed to aqueous solutions of such alcohols.

The property of inhibiting corrosion is retained by such solutions at elevated temperatures, for example, at the boiling point of water. Because of this property, the higher fatty acids may be advantageously employed for prevention of corrosion in automobile radiators by polyhydric alcohol anti-freeze mixtures as well as in iron storage tanks, drums or cans.

The higher fatty acids may be employed either singly or in combination and may also be employed to inhibit corrosion by a mixture of polyhydric alcohols or a mixture containing a polyhydric alcohol and a monohydric alcohol as well as to inhibit corrosion by individual polyhydric alcohols.

Although the example given herein represents a preferred embodiment of the invention, it will be understood that the compounds specifically disclosed therein as well as the particular proportions and temperatures are mentioned by way of illustration only, and that it is not applicant's intention to be limited except as indicated by the scope of the appended claims.

We claim:

1. A non-corrosive mixture comprising an aqueous solution of a polyhydric alcohol and a higher fatty acid which is substantially insoluble in water.

2. A non-corrosive mixture comprising an aqueous solution of a polyhydric alcohol and an acid of the group containing stearic, oleic and palmitic acids.

3. A non-corrosive mixture comprising an aqueous solution of an alcohol of the group containing dihydric and trihydric alcohols, and a higher fatty acid which is substantially insoluble in water.

4. A non-corrosive mixture comprising an aqueous solution of an alcohol of the group containing glycerine and glycol, and a higher fatty acid of the group containing stearic, oleic and palmitic acids.

5. A non-corrosive mixture comprising an aqueous solution of glycerine and oleic acid.

6. A process for minimizing the corrosion of iron upon contact with an aqueous polyhydric alcoholic solution which comprises contacting said solution with iron in the presence of a higher fatty acid which is substantially insoluble in water and is dissolved in said alcoholic solution.

7. The process of minimizing the corrosion of iron upon contact with an aqueous solution of an alcohol of the group consisting of the dihydric and trihydric alcohols, which comprises contacting said solution with iron in the presence of a higher fatty acid dissolved in said solution and of the group consisting of stearic, oleic and palmitic acids.

8. The process of inhibiting the corrosion of iron by an aqueous solution of glycerine in contact therewith by the application to said iron of a higher fatty acid dissolved in said solution.

9. The process of inhibiting the corrosion of iron by an aqueous solution of glycerine in contact therewith by the application to said iron of oleic acid dissolved in said solution.

In testimony whereof we affix our signatures.

WILLIAM S. CALCOTT.
HERBERT W. WALKER.